April 28, 1959   D. E. DAVIDSON   2,883,875

ELEVATOR FOR TRIPOD

Filed Nov. 12, 1954

INVENTOR.
DONALD E. DAVIDSON,
BY
*Forrest J. Lilly*
ATTORNEY.

United States Patent Office 2,883,875
Patented Apr. 28, 1959

2,883,875

ELEVATOR FOR TRIPOD

Donald E. Davidson, La Habre, Calif.

Application November 12, 1954, Serial No. 468,293

7 Claims. (Cl. 74—424.6)

The present invention relates to camera supports, and more particularly to devices of this class adapted to be mounted on a tripod and operable to raise and lower the camera. The chief advantage of this type of camera support is that it enables the photographer to elevate the camera to a height considerably beyond the maximum extension of the tripod, or to make any desired adjustment of the vertical position of the camera, within certain limits, without disturbing the tripod setting. While the invention is intended primarily for use with cameras, it is not in any way limited to such service, but might be used with equal advantage to provide a vertically adjustable support for other devices such as telescopes, easels, light duty table tops, and the like.

The primary object of the present invention is to provide an elevating support having an irreversible, accurately controllable mechanism wherein clearances between movable parts are taken up at all times to provide a firm, rock-steady support for the camera.

Another object of the invention is to provide an elevating support having a wide range of vertical travel and capable of quick adjustment from one extreme position to the other, as well as extremely precise adjustment to any desired position.

A further object is to provide an elevating support that is so constructed and arranged that the camera is positively held at any desired position, even when not locked, thereby eliminating the possibility of dropping and damaging an expensive camera.

Another object is to provide an elevating support of the class described embodying a novel locking arrangement which is simple in construction and operation, and at the same time extremely effective. An important feature of the lock is that it wedges the elevating rack tightly against its guiding ways, taking up all clearances and providing a rigid, absolutely steady support for the camera.

Still another object of the invention is to provide an elevating support that is simple and inexpensive to manufacture, compact, light in weight, and that never requires oiling.

The foregoing objects are attained by mounting the camera on the top end of a vertically movable rack having teeth on one side and V-shaped ribs on the other side which are engaged by correspondingly shaped nylon guide ways mounted on the housing. The teeth of the rack are engaged by a spiral ramp gear member of nylon which is mounted on an inclined axis, and the sides and top of the spiral ramp are parallel to opposite sides of the rack teeth. As the spiral ramp gear is turned, the rack is raised or lowered. The weight of the camera and rack causes the latter to bear downwardly on the inclined lifting surface of the spiral ramp gear, which causes the rack to be cammed snugly against the V-shaped ways on the other side. The rack is locked in adjusted position by means of a screw-threaded arrangement which advances the spiral ramp gear along its inclined axis, thereby crowding the rack tightly against the V-shaped ways.

The foregoing and other objects and advantageous features of the present invention will become apparent to those skilled in the art upon consideration of the following detailed description of the preferred embodiment thereof, reference being had to the accompanying drawings, wherein.

Figure 3:
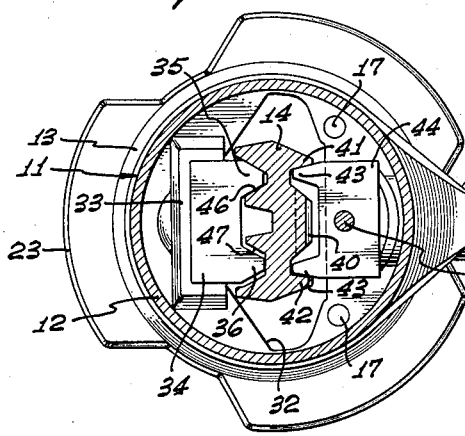
Fig. 3 is a transverse sectional view, taken at 3—3 in Fig. 2.

In the drawings, the elevating support of the invention is designated in its entirety by the reference numeral 10, and is seen to comprise a housing 11 made up of upper and lower portions 12 and 13, which are preferably die castings, and are joined together by two screws 17 (see Fig. 3). Extending down through the center of the housing 11 and slidable vertically with respect thereto is a rack 14; and mounted on the top end of the rack is tilt head 15 carrying the camera 16. The tilt head 15 is of the type permitting the camera to be swung about a central vertical axis, and also to be tilted about a horizontal axis, designated at 20. The camera is rotated about its two axes by means of a handle 21, which can also be turned to lock the tilt-head at any adjusted position of tilt about the axis 20, while a locking lever 22 locks the head in any desired position about the vertical axis.

The lower portion 13 of the housing is generally cup-shaped, and is provided with a depending flange 23 which projects down over and encloses the top ends of three tripod legs 24. A transverse pivot pin (not shown) projecting from opposite sides of each of the tripod legs at the top end thereof, seats in downwardly facing V-shaped notches 25 that are formed in the inner surface of the cup-shaped housing portion 13, and these pins are clamped into the notches 25 by a clamping plate 26. The clamping plate 26 is secured to the housing member 13 by three screws 30, two of which can be seen in Fig. 2, the said screws being screwed into tapped holes 31.

The top of the lower housing portion 13 has an opening 32 formed therein which extends diametrically from one side to the other, and the rack 14 passes upwardly through this opening. Extending upwardly from the top of the housing member 13 on one side of the opening 32 is a channel-shaped projection 33, which holds a nylon block 34 having two laterally spaced, vertically extending, V-shaped ways 35 and 36 formed on the outer surface thereof. The nylon block 34 may conveniently be pressed into the channel of the projection 33 and is solidly held thereby.

Figure 5:
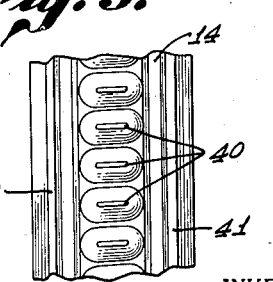
Fig. 5 is an elevational view of a portion of the rack, showing the configuration of the teeth.

The rack 14 is preferably die cast of zinc or aluminum alloy, and is formed to the cross section shown in Fig. 3. Projecting from one side of the rack are teeth 40, which are preferably formed with a 90° included angle between their sides (see Fig. 2), and extend across the face of the rack at a slight angle, as best seen in Fig. 5. The ends of the teeth may be rounded off, as shown, although this is not necessary. Laterally outward from the ends of the teeth 40 are flanges 41 and 42, which are slidably engaged on their inner surfaces by guide projections 43 on a nylon plate 44. The plate 44 is attached by a fastener 45 to the underneath side of the upper housing member 12, and serves to hold the upper portion of the rack against the nylon ways 35 and 36.

On its opposite side, the rack 14 is formed with two laterally spaced V-shaped ways 35 and 36. As shown in Fig. 3, channel 47 is somewhat wider and shallower than channel 46, and the flat end of the V-shaped guide way 36 bears on the flat bottom of the channel 47, while the sloping sides of the way 36 are spaced inwardly from the sloping sides of the channel 47. In the case of the other guide way 35 and channel 46, however, it is the sloping sides of the way that bear against the sloping sides of the channel, and the flat bottom of the way is spaced from the flat bottom of the channel. Thus, the V-shaped way 35 guides the rack in its vertical travel, while the flat-surface contact of way 36 provides a stabilizing effect with minimum frictional resistance and without binding. One advantage of the arrangement just described is that when the sloping sides of way 35 and the flat surface of way 36 become worn, it is possible to reverse the rack 14 end for end, and thus utilize the unworn sloping sides of way 36 and flat end surface of way 35. Thus, the useful life of the nylon block 34 with its ways 35, 36 is doubled.

Figure 2:
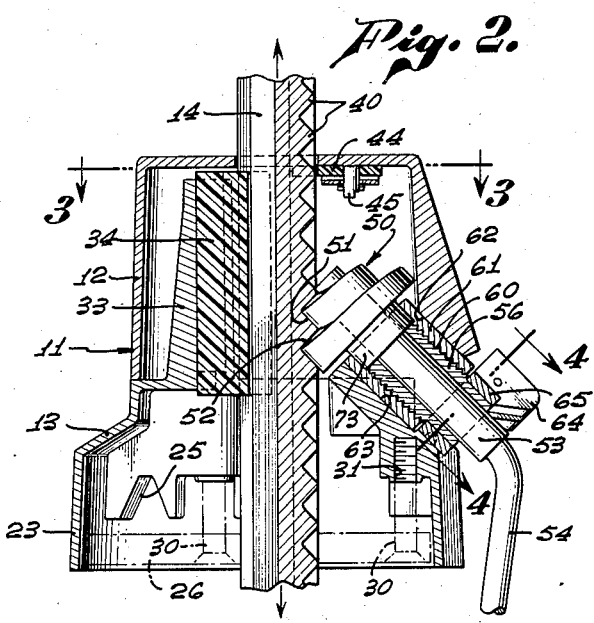
Fig. 2 is a sectional view through the same, taken along the vertical plane formed by the intersecting centerlines of the rack and the inclined spiral ramp gear.

The rack 14 is raised and lowered with respect to the housing 11 by means of a spiral ramp gear member 50, which is preferably molded of nylon, and which is mounted in the housing for rotation about an axis inclined at approximately 45° to the longitudinal axis of the rack. One side of the inclined spiral ramp gear member 50 abuts against the teeth 40 of the rack and, as shown in Fig. 2, the outer peripheral surface 51 of the ramp is parallel to the top surfaces of the teeth, while the top surface 52 of the ramp is parallel to the bottom surfaces of the teeth. It is the top surface 52 of the spiral ramp that is the lifting surface, and the peripheral surface 51 is the lowering surface. As the member 50 is turned, the 90° V-shaped notch formed by the intersecting surfaces 51, 52 moves up or down, carrying the rack tooth with it and thereby elevating or lowering the rack.

The spiral ramp gear member 50 is fixedly mounted on a steel shaft 53, which projects through the wall of the housing and terminates in a crank 54 having a star-shaped handle 55 thereon. The shaft 53 is journaled in a brass sleeve 56 having screw threads 60 on its outer surface, and the sleeve is screwed into an internally threaded tubular member 61, which is clamped between the two halves 12 and 13 of the housing 11. The upper housing portion 12 is provided with a cylindrically curved seating surface 62 to receive the top half of the tubular member 61, while the lower housing portion 13 has a corresponding cylindrically curved seat surface 63 to receive the bottom half of the tubular member. When the two screws 17 are tightened up, the tubular member 61 is solidly clamped between the seating surfaces 62 and 63, and is held thereby against turning or axial movement.

Figure 1:
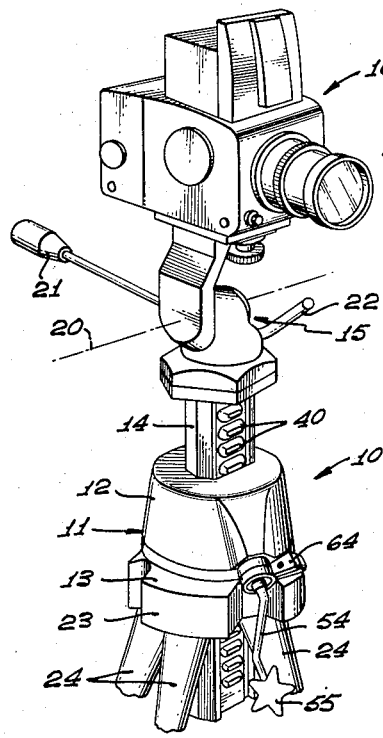
Fig. 1 is a perspective view of an elevating tripod head embodying the features of the invention, and showing a camera mounted on the top end of the elevating rack.
Figure 4:
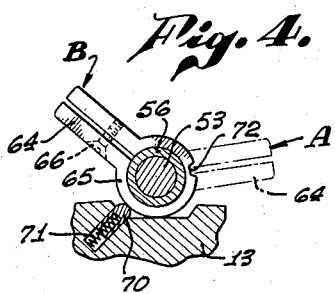
Fig. 4 is a sectional view through the locking device, taken at 4—4 in Fig. 2.

The bottom end of the sleeve 56 projects beyond the end of the tubular member 61, and has a locking lever 64 attached thereto. The locking lever 64 has a hub portion 65 embracing the sleeve 56, and is preferably split, as shown in Fig. 4; the two sides being drawn together by means of a screw 66, which clamps the lever tightly to the sleeve. A detent plunger 70 is slidably disposed within a hole in the lower housing portion 13, and is pressed against the hub 65 of the locking lever by a spring 71. The detent plunger 70 seats in a depression 72 in the hub 65 when the locking lever is in the unlocked position indicated at A, and bears on the surface of the hub when the lever is in the locked position shown at B.

The top end of the sleeve 56 abuts against a hub 73 extending downwardly from the bottom of the spiral ramp gear member 50, and serves to locate the axial position of the latter. When the locking lever 64 is at the unlocked position A, the spirial ramp gear member 50 is backed away from the rack slightly to provide a small amount of clearance for free relative movement. Swinging the locking lever 64 over to the locked position B causes the sleeve 56 to be screwed upwardly into the tubular member 61, thereby advancing the spiral ramp gear member toward the rack 14 and crowding the latter tightly against the ways 35, 36. This has the effect of clamping the rack rigidly in place and taking up all clearances, so that the camera is held rock-steady.

One advantageous feature of this arrangement is that the weight of the camera and rack causes the teeth 40 to bear downwardly on the inclined lifting surface 52 of the spiral ramp gear member when the lever 64 is unlocked, which causes the rack to be cammed lightly over against the guide ways 35, 36. Thus, the working clearances are taken up without binding the action of the gear member 50 on the rack teeth, and the V-shaped way 35 prevents any sidewise shake.

The nylon guide ways 35, 36, spiral ramp gear member 50, and plate 44 provide a low friction action which never requires oiling, and therefore eliminates the possibility of soiling clothes or other materials with which it comes in contact. The spiral ramp gear 50 and rack 14 are irreversible, which means that the rack cannot be forced down by pressure alone, but must be lowered by turning the handle 54.

The operation of the invention is believed self-evident from the foregoing description, and need not be repeated here. The many advantageous features of the invention will likewise be recognized by those skilled in the art.

While the preferred embodiment of the invention has been described in considerable detail, it will be understood that this is merely an illustrative form, and that various changes may be made in the shape and arrangement of the several parts without departing from the broad scope of the appended claims.

I claim:

1. An elevating support comprising a housing, a rack slidably mounted on said housing and having rack teeth on one side thereof, a way on said housing slidably engaging a portion of said rack on the side opposite said teeth to guide said rack in its travel, a rotatable, generally conical worm, an axially adjustable thrust bearing journalling said worm for rotation about an axis inclined at an acute angle to said rack, said worm having a generally spiral, helical formation meshing with the teeth of said rack, said thrust bearing being axially adjustable to axially move said worm toward and away from said rack, and locking means operable to advance said worm in the direction of said rack so as to crowd the latter tightly against said way and thereby lock said rack in vertically adjusted position.

2. An elevating support comprising a housing, a vertically disposed rack slidably mounted on said housing and having teeth on one side thereof, a way on said housing slidably engaging the other side of said rack, an inclined sleeve rotatably supported within said housing on the toothed side of said rack, said sleeve having screw threads engaging companionate threads on said housing, a shaft journaled within said sleeve, a spiral ramp gear member fixed to the inner end of said shaft and abutting against the end of said sleeve, said spiral ramp meshing with the teeth of said rack in driving engagement therewith, a handle on said shaft for turning the same to raise and lower said rack, and a locking lever attached to said sleeve for rotating the same, said sleeve being advanced toward said rack by said threads when the sleeve is rotated in one direction, thereby crowding the rack tightly against said way to lock the rack in vertically adjusted position.

3. An elevating support for a camera comprising a housing having upper and lower portions which are secured together, a vertical rack extending through said housing and having teeth on one side thereof, said rack having a pair of laterally spaced, longitudinally extending flat bottomed, substantially V-shaped channels formed on its other side, one of said channels being wider and shallower than the other, a pair of substantially identical guide ways on said upper housing portion engaging in said V-shaped channels on said rack, one of said ways slidably engaging the sloping sides of the narrower channel, and the other way engaging the flat bottom surface of the wider channel, an internally threaded tubular member clamped between said upper and lower housing portions and disposed at an angle of approximately 45° to the longitudinal axis of said rack, an externally threaded sleeve screwed into said tubular member and projecting from said housing, a locking lever attached to the projecting end of said sleeve, a shaft journaled within said sleeve, a spiral ramp gear member fixed to the inner end of said shaft and abutting against the teeth of said rack, the sides and top surfaces of said spiral ramp being parallel to the opposite sides of the rack teeth, and a handle for turning said shaft, said sleeve abutting against the end of said spiral ramp gear member and being operative to push the latter toward said rack when said locking lever is swung in one direction, thereby crowding said rack against said ways to lock the rack in adjusted position.

4. An elevating support, comprising: a housing; a rack mounted for longitudinal sliding movement on said housing, said rack including a series of longitudinally spaced, generally V-shaped rack teeth along one side thereof; a shaft journalled on said housing at said one side of and extending at an acute angle to said rack; a generally conical worm on the end of said shaft proximate to said rack, said worm being formed with a generally spiral, helical ramp formation meshing with said rack teeth and defined by intersecting side and end walls which spiral inwardly of the shaft toward said one end of the latter, said end wall facing in a generally axial direction of said shaft and being engageable with one side of said rack teeth, said side wall facing in a generally radial direction of said shaft and being engageable with the other side of said rack teeth, said walls and the respective sides of said rack teeth being substantially parallel in the zone of contact of said worm with the rack; and means for turning said shaft to move said rack in opposite longitudinal directions.

5. The subject matter of claim 4 wherein said end wall and one side of said rack teeth extend substantially normal to the axis of said shaft and said side wall and other side of said rack teeth substantially parallel said axis.

6. The subject matter of claim 4 including an axially adjustable thrust bearing for said shaft, and means for axially adjusting said bearing toward and away from said rack whereby to move said worm axially toward and away from said rack.

7. The subject matter of claim 4 wherein said shaft is inclined at approximately 45° to said rack, said end wall and one side of said rack teeth extend substantially normal to the axis of said shaft, and said side wall and other side of said rack teeth substantially parallel said axis.

References Cited in the file of this patent
UNITED STATES PATENTS

| | | |
|---|---|---|
| 162,009 | Baker | Apr. 13, 1875 |
| 390,199 | Blackmore | Oct. 2, 1888 |
| 786,706 | Wustner | Apr. 4, 1905 |
| 805,524 | Bryant | Nov. 28, 1905 |
| 1,231,000 | Crist et al. | June 26, 1917 |
| 2,321,800 | Codrey et al. | June 15, 1943 |
| 2,484,982 | Coutant | Oct. 18, 1949 |
| 2,508,122 | Mooney | May 16, 1950 |
| 2,535,228 | Palmer | Dec. 26, 1950 |
| 2,688,881 | Crossland | Sept. 14, 1954 |